United States Patent [19]

Hamel

[11] 3,999,497
[45] Dec. 28, 1976

[54] SHOCK-ABSORBING BUFFER FOR BOARDING FENDER

[75] Inventor: Denis Hamel, St-Mande, France

[73] Assignee: Pneumatiques, Caoutchouc Manufacture et Plastiques Kleber-Colombes, France

[22] Filed: June 13, 1975

[21] Appl. No.: 586,617

[30] Foreign Application Priority Data

June 13, 1974 France .............. 74.20515

[52] U.S. Cl. ................ 114/219; 61/48; 267/140
[51] Int. Cl.² ............ F16F 7/12; B63B 59/02
[58] Field of Search ........ 267/140, 139, 152, 153; 61/48; 114/219; 293/1, 60, 87, 70, DIG. 2

[56] References Cited
UNITED STATES PATENTS

| | | | |
|---|---|---|---|
| 3,235,244 | 2/1966 | Hein | 114/219 |
| 3,339,907 | 9/1967 | Parker | 267/140 |
| 3,555,832 | 1/1971 | Narabu | 61/48 |
| 3,600,896 | 8/1971 | Tateisi | 267/140 |
| 3,716,999 | 2/1973 | Middelbeek | 267/140 |

Primary Examiner—James B. Marbert
Attorney, Agent, or Firm—Craig & Antonelli

[57] ABSTRACT

A shock-absorbing buffer for boarding fenders used for the protection of ships and waterway port structures has a hollow rubber body in the form of a tubular sleeve with a thick wall subjected to compression-bending, and rigid mounting plates affixed to its extremities which are arranged parallel to each other and at right angles to an axis of revolution of the rubber body. The buffer also includes an annular radially extensible rubber element which contacts and encloses at least one of the extremities of the hollow rubber body. This rubber element is separate from the rubber body and is adjacent to the mounting plate at this extremity.

8 Claims, 9 Drawing Figures

SHOCK-ABSORBING BUFFER FOR BOARDING FENDER

This invention relates to shock-absorbing buffers made of rubber for boarding fenders used for the protection of ships and maritime or waterway port structures, such as piers, jetties, wharves, etc. More particularly, the invention relates to shock absorbers of a type comprising a hollow rubber body, in the form of a tubular sleeve, of rotation about an axis perpendicular to the supporting surface on the structure to be protected; this rubber body, by the compression and by bending or yielding of its wall, is possible to withstand and damp the boarding shocks directed along that axis.

The invention serves notably for improving these shock-absorbing buffers so that they can absorb shocks and stresses of the boarding operation of great magnitudes, while reducing the reactive forces exercised on the fixed structure as well as on the wall of the ship in such a manner that both the structure and the ship are better protected. Further objects of the invention reside in augmenting the lateral stability of this kind of buffers, i.e. improving their capability of withstanding the inclined shocks and stresses which have components in parallel to the supporting wall surface of the structure to be protected, without the result that these buffers come to lie on their sides, to permit the buffers to withstand without rupture the shocks and stresses, either exceptional or accidental which greatly exceed the maximum specified stresses. Additionally, the invention serves the purpose of reducing the weight and bulk characteristics to notably facilitate the transport of the buffers and their installation.

Examples for understanding the shock-absorbing buffers for boarding fenders according to this invention are described hereinbelow with reference to the appended drawings wherein.

Figure 1:
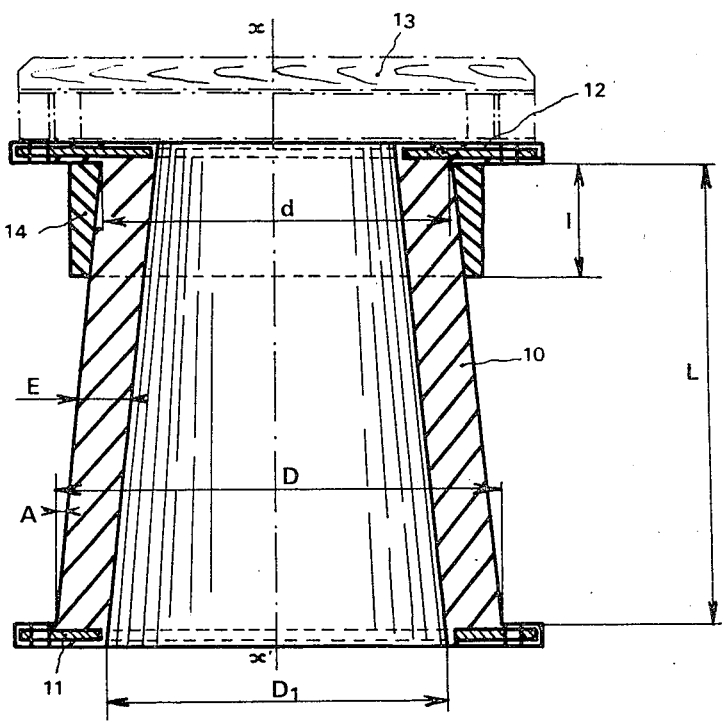
FIGS. 1 and 2 are an axial section and an end view of a first embodiment.
Figure 2:
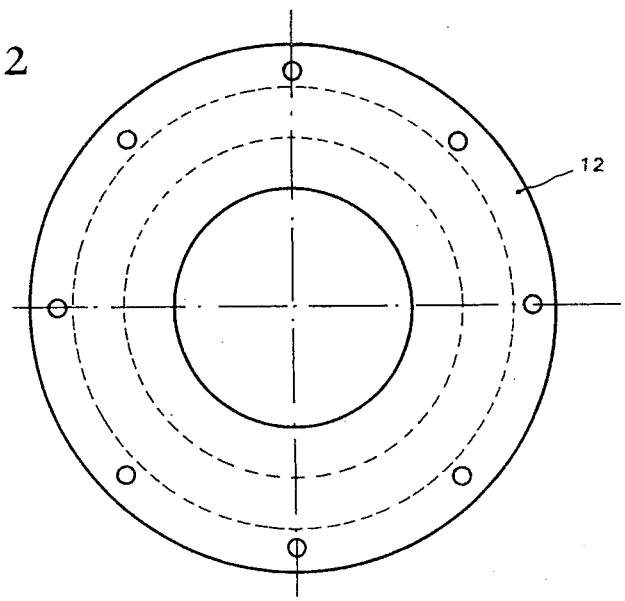

The shock absorbers shown in the drawings generally comprise a hollow rubber body 10 having the shape of a tubular sleeve extending around an axis $x\,x'$, this body having an axial length L, a maximum diameter D, and a wall thickness E. The hollow rubber body is affixed at its ends to annular rigid plates 11 and 12 in parallel to each other and disposed along planes perpendicular to the axis $x\,x'$. These plates are overlapping with respect to the body 10 to form flanges provided with bores for the passage of fastening screws. The plate 11 normally constitutes the base plate affixed to the wall of the structure to be protected, such as the vertical face of a pier while the plate 12 is utilized for the mounting of a protecting shield 13. The plates 11 and 12 advantageously have the same outer diameter and their mounting bores are distributed along the circumferences of the same diameter so that the buffer can be mounted indifferently in one or the other sense.

In the embodiments shown, the rubber body 10 has a generally truncated-cone shape with an angle of conicity $2 \times A$ of about 10°–20°, contributing toward its lateral stability. For the same purpose, the rubber body is so proportioned that its axial length L is between 0.9 and 1.2 times the outer diameter D of the large truncated-cone base of the body and, in order to confer on the buffer the desired properties of axial deflection and shock absorption, this axial length L is on the order of 7–10 times the radial thickness E of the wall of body 10. Preferably, the conicity of the body, its thickness E, and its length L are chosen so that the outer diameter $d$ of the small base of the truncated-cone body is almost equal to the internal diameter $D_1$ of the large base.

The buffers disclosed herein comprise an annular element 14 enclosing and surrounding one of the extremities of the rubber body in the vicinity of the corresponding end plate, in the case as shown in the drawings in the vicinity of the mounting plate 12 of the shield 13 disposed on the side of the base of the small diameter of body 10. This annular enclosing or housing element 14 extends along an axial distance $l$ of between 1/5 and 1/3 of the axial length L of the hollow rubber body 10.

In the case of FIGS. 1, 2, 3 and 4, the annular housing element 14 consists of a single rubber piece separate from the body 10. This element 14 is supported on one side on the internal face of the outer ledge of the end plate 12 and tightly surrounds the outside of the body adjacent to this plate. The element can be made of a rubber blend having elastic characteristics which are analogous to or somewhat different from those of the body 10 in accordance with the desired characteristics of the buffer.

Figure 3:
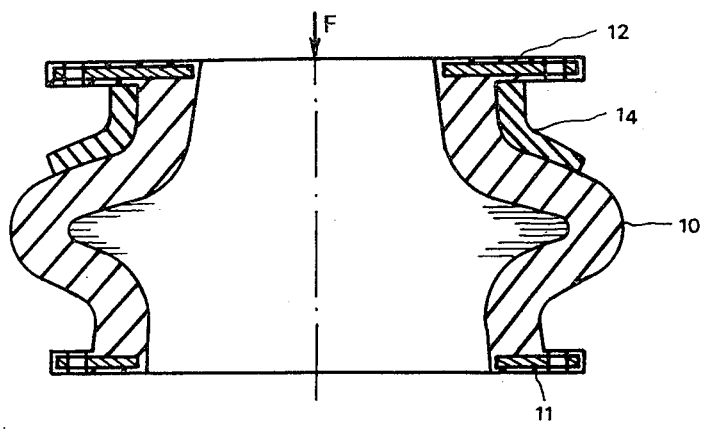
FIGS. 3 and 4 are axial sectional views of this buffer during the compression.
Figure 4:
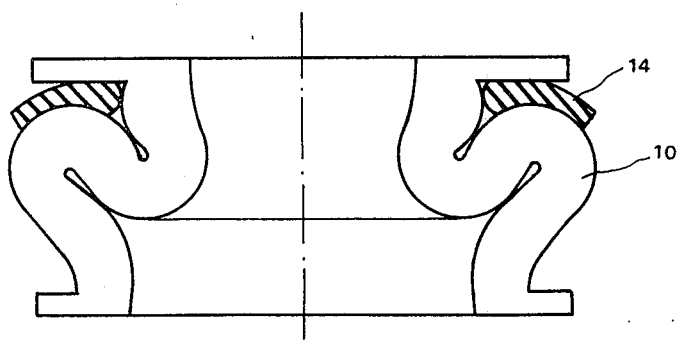
Figure 5:
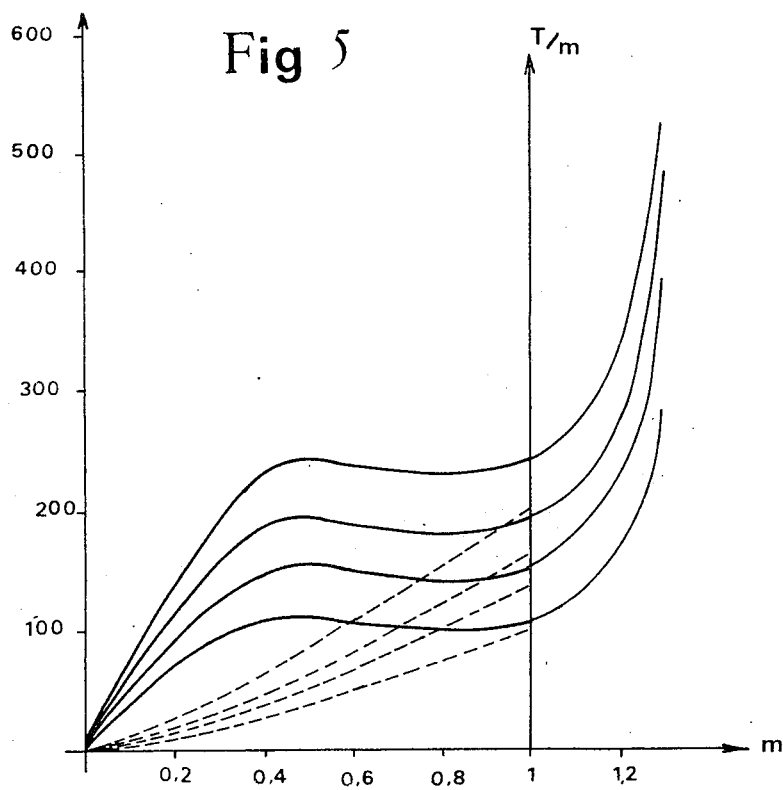
FIG. 5 is a diagram illustrating the course of deformation curves of the buffer with different rubber hardnesses.

FIG. 3 illustrates the mode of operation of the housing element 14 during the course of the deformation of the buffer under the effect of a shock or stress F directed in the axial direction. At the beginning of the deformation, the body 10 resists this stress by acting principally in a compression mode, and then the tubular wall of the body bends toward the exterior in its middle zone. The annular element 14 then intervenes to resist this flexion and also to prevent a sudden reduction in stiffness of the body at the moment its wall is yielding. During this phase of the operation, the element 14 also flexes by elastically lengthening its free edge which glides somewhat with respect to the surface of the body 10. At the end of the deformation (FIG. 4), the internal surfaces of the flexed portion of body 10 can come into contact, whereas the element 14 is interposed between the bulging outer surface of the body 10 and the rigid outer ledge of the plate 12, and the fender or buffer then functions almost completely under compression so that its rigidity is quickly increased. This last portion of the mode of operation corresponds under practical conditions to exceptional deformations and to stresses which greatly exceed the maximally intended stress value. FIG. 5 shows in solid lines the course of the deformation curves of the buffer of a kind as described hereinabove. One can see that, at the beginning of the deformation, the curve rises rapidly in correspondence with an increase in rigidity if the body 10 labors essentially under compression. Then, the rigidity is stabilized during a substantial portion of the compression or crushing process corresponding to the flexural deformation of the body. Finally, the rigidity is enhanced at the end of the deformation when the body again acts under compression. It can then double for a supplemental bending of 25% of the maximum course or stroke foreseen.

The additional resistance provided by the enclosing element 14 during the phase of flexural deformation of the body 10 permits precisely the stabilization of the rigidity of the buffer in that zone of deformation. The curves illustrated in FIG. 5 have been obtained with buffers located at the top of the range of a unitary weight of about 5 tons, with a maximum outer diameter of 2.2 meters and an axial length of 2.1 meters, and having a normal compression stroke of 1 meter. The curves correspond to buffer bodies of different Shore A hardness values (60 - 65 - 70 - 75) and with an enclosing element 14 of rubber having a Shore hardness of 45. These different buffers can absorb, respectively, energies of 100, 130, 160, and 200 tons/meter (curves in dashed lines) with maximum reactions of 120, 150, 190, and 240 tons or with an energy/reaction ratio of 0.83, which is particularly advantageous. With enclosing elements of greater hardness, one can still increase the energy absorption capacities of these buffers up to 25%, which in case of the buffers under consideration is up to 250 tons/meter. The use of rubber mixtures of diverse hardnesses for the body 10 and the element 14 makes it possible to adjust each buffer to whatever energies are comprised in the intended range. A similar adjustment of the elastic characteristics of the buffers can furthermore be obtained by varying the thickness E of the body wall, its conicity and/or the dimensions of the elastic ring 14. In addition, due to their conical configuration, the buffers provide a good lateral stability in the overall sense; the buffers of 200 tons/meter can support in the transverse direction an occasional maximum stress of 60 tons with a lateral deflection of merely 27 cm. The conical shape of the body 10 and the presence of the enclosing element 14 also cooperate to obtain these good shock absorption and increased energy characteristics with a relatively low weight, because they make it possible, without compromising the lateral stability, to provide substantial bending strokes or paths during which the body functions principally in controlled flexion.

Figure 6:
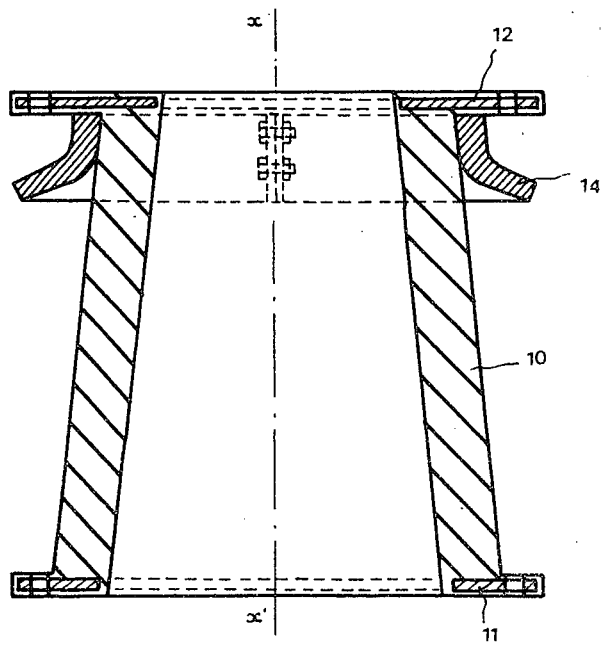
FIGS. 6 and 7 show other embodiments of the buffer in axial sectional views.

The buffer for a boarding fender as illustrated in FIG. 6 is similar to the preceding buffer except that the enclosing element 14 is of a rigid material, for example metal. In this case, its free end opposite to the mounting plate 12 is profiled so that it diverges progressively from the outer surface of the rubber body. In this way, the element 14 only intervenes for controlling the flexion of the middle portion of the body 10 after a certain compression path or stroke to avoid a sudden reduction in the stiffness of the buffer. The rigid element 14 is preferably made up of two or more parts to facilitate the mounting thereof. It can be mechanically connected to the mounting plate 12.

Figure 7:
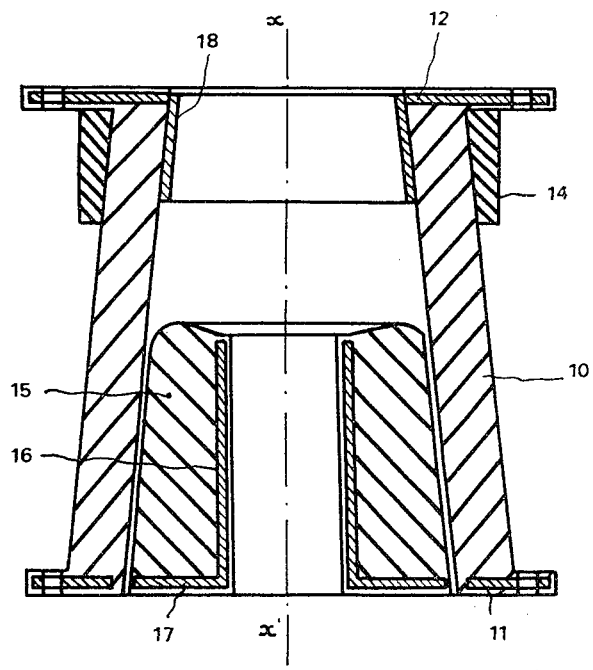

The buffer illustrated in FIG. 7 is similar to that of FIG. 1 but furthermore is associated with an auxiliary elastic support 15 limiting the compression stroke of the buffer body. This internal support can be provided at a central fitting 16 of tubular shape, comprising a flange 17 to affix same to the vertical wall of the structure. The rubber sleeve extends slightly beyond the extremity of the fitting to form a cushion against which rests, at the end of the stroke, the internal surface of the extremity of the rubber body 10. The axial length of this support can be between one-half and approximately one-third of the axial length of the rubber body.

The above-described buffers can furthermore comprise at the end of the rubber body a rigid tubular collar 18 extending axially along about ¼ of the length of body 10; this collar serves for the purpose of increasing the resistance against tangential components of oblique stresses tending to laterally deform the buffer, particularly if it is already axially compressed. This collar is preferably fixedly joined to the mounting plate 12, but it does not adhere to the internal surface of the body 10 so that its axial deformation capability is not diminished.

Figure 8:
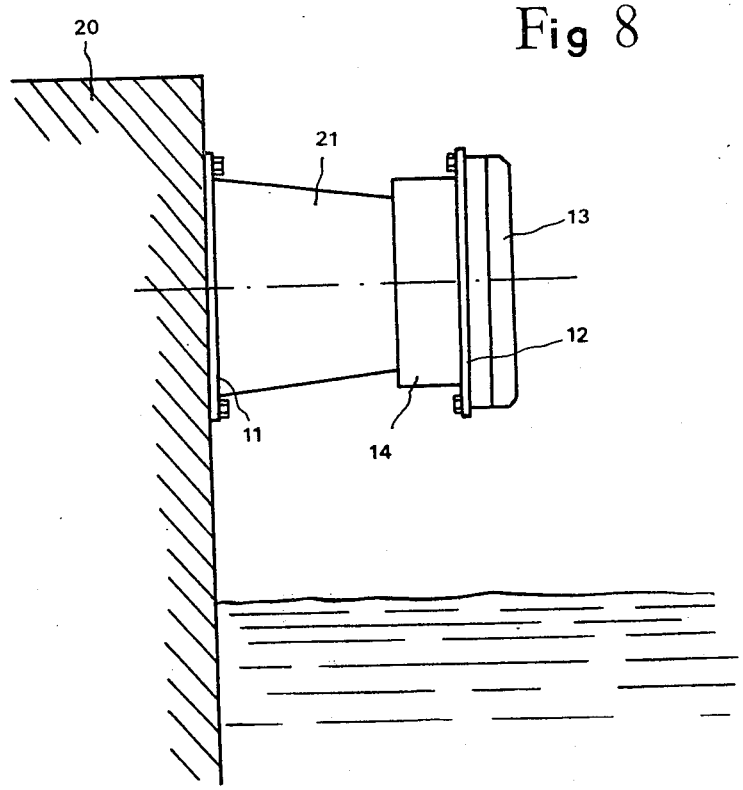
FIGS. 8 and 9 are schematic views showing in lateral elevation and plan view a boarding fender comprising the shock-absorbing buffers according to the present invention.
Figure 9:
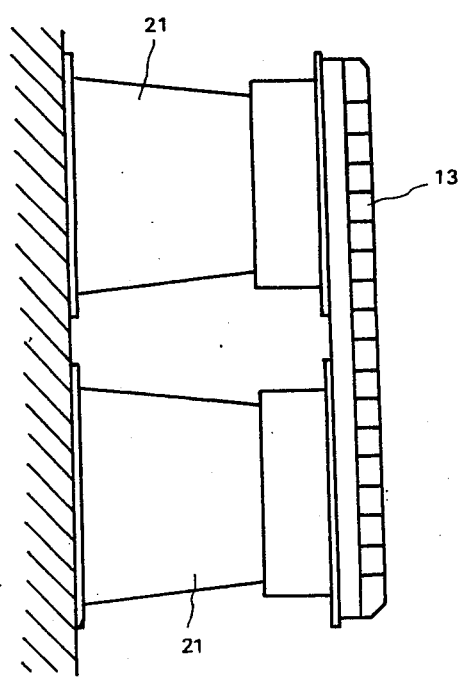

FIGS. 8 and 9 show an example of realizing a boarding fender for the protection of a pier 20 by means of a shield 13 arranged in parallel to the vertical face of the pier. The shield is supported by an appropriate number of shock-absorbing buffers 21 of the type described hereinabove, affixed to the pier by their base plate 11 and to the shield by their plate 12. These buffers make it possible for the shield 13 to approach the pier in case of a boarding shock caused by a ship and having a force component normal to the pier. The stability of the buffers makes it possible fo them to correctly support the own weight of the shield and to elastically resist without buckling to inclined berthing stresses having tangential components along no matter what direction included in a plane in parallel to the vertical face of the pier.

What is claimed is:

1. A shock-absorbing buffer for boarding fenders used for the protection of ships and waterway port structures which comprises a hollow rubber body in the form of a tubular sleeve of revolution with a thick wall subjected to compression-bending and affixed at its extremities to rigid mounting plates that are arranged parallel to each other at right angles to the axis of revolution of the rubber body, and an annular radially extensible element contacting and enclosing at least one of the extremities of the hollow rubber body on the outside, said element is separate from the rubber body, is adjacent to a mounting plate located at the one extremity, extends from said mounting plate along an axial distance between 0.20 and 0.35 of the axial length of the hollow body and is comprised of an elastic rubber material.

2. A shock-absorbing buffer according to claim 1, wherein the annular radially extensible element rests on an overlapping outer edge of said mounting plate for the hollow body.

3. A shock-absorbing buffer according to claim 1, wherein the hollow rubber body has the general form of a truncated cone with a conicity on the order of 10°–20°, and a small base at one of the extremities, said annular radially extensible element extending from the adjacent mounting plate, which is located on the small base of the body.

4. A shock-absorbing buffer according to claim 3, wherein the hollow rubber body has an axial length L of between 0.9 and 1.2 times its maximum outer diameter D and between 7–10 times the minimum radial thickness E of its wall.

5. A shock-absorbing buffer according to claim 3, wherein the conical hollow rubber body has a thickness E substantially constant from one end to the other end of the body, with a small base having an external diameter ($d$) substantially equal to the internal diameter ($D_1$) of a large base.

6. A shock-absorbing buffer according to claim 1, wherein the hollow rubber body contains an auxiliary elastic support for limiting the path of axial compression of the buffer at one extremity of said body.

7. A shock-absorbing buffer according to claim 6, wherein the auxiliary support has an axial length between one-half and approximately one-third of the axial length of the hollow rubber body.

8. A shock-absorbing buffer according to claim 7, further comprising a rigid collar providing lateral stiffening, inserted in the other extremity of the hollow rubber body, and extending along an axial distance approximately equal to one-fourth of the axial length of the body.

* * * * *